Patented Dec. 2, 1947

2,431,738

UNITED STATES PATENT OFFICE 2,431,738

PRODUCTION OF SHRINKPROOF FILM

Donald Ellsworth Drew, Snyder, N. Y., assignor to E. I. du Pont de Nemours & Company, Wilmington, Del., a corporation of Delaware No Drawing. Application April 16, 1943, Serial No. 483,356

4 Claims. (Cl. 117—103)

This invention is concerned with the production of articles having improved physical characteristics and pertains particularly to the production of regenerated cellulose film which is substantially flat and free from permanent shrinkage.

Although the invention is not limited in its broader aspects to regenerated cellulose, nevertheless the invention has particular application to regenerated cellulose and will be described hereinafter with specific reference to regenerated cellulose as a preferred material.

Thin regenerated cellulose film, generally useful as a wrapping foil or tissue, is customarily made by extruding a viscose solution through an elongated slit or orifice into a casting bath which coagulates the cellulose xanthate and regenerates it into cellulose. The film thus produced is washed and otherwise purified, is impregnated with a softener such as glycerin and is dried. The film, as it goes into the drier, contains about 300% moisture, based on the weight of the cellulose, and as it leaves the drier, it contains about 6% to 7% moisture, based on the weight of the cellulose. The large loss of moisture during drying is accompanied by a very considerable shrinkage of the film, which shrinkage is non-uniform and introduces into the film internal strains. Film thus produced, when exposed to abnormally low relative humidity, shrinks further and does not regain its original dimensions when returned to normal atmospheric conditions; the same phenomenon occurs when the film is subjected to high relative humidity air conditions, followed by contact with air having a low relative humidity. This characteristic of permanent loss in dimension is termed "permanent shrinkage" and is discussed in detail in Alles and Edwards U. S. Patent No. 2,115,132, issued April 26, 1938. The characteristic termed "permanent shrinkage" is a serious defect for many uses; for example, a package of goods neatly wrapped in the factory with dry regenerated cellulose film is subject to rupture of the wrapping tissue due to progressive permanent shrinkage and may become unsalable for that reason. Similarly, a film of regenerated cellulose laminated to a semi-rigid member such as light-weight cardboard, used as a cover for a pamphlet or the like, permanently and progressively shrinks due to varying humidity conditions and causes the laminated material to curl and make the booklet unattractive.

It is an object of this invention to provide a method for greatly diminishing or eliminating the characteristic of permanent shrinkage which is inherent in certain materials such as regenerated cellulose. Other objects will appear hereinafter.

The objects of the invention are achieved in general by applying to a hydrophilic or water-sensitive film in the dry state, i. e. containing not more than about 10% moisture, a coating containing as a film-forming agent a hydrophobic or water-insensitive material, setting up the coating as a continuous film, as by removal of solvents, subjecting the dry, composite film to the action of liquid water, steam or high relative humidity air whereby to effect the absorption of a substantial amount of water by the water-sensitive film base, then drying the composite film under very low tension, down to a moisture content which is in approximate equilibrium with average atmospheric conditions. It has been found that this procedure very markedly diminishes and, from a practical standpoint, eliminates the inherent tendency in such water-sensitive films to progressively and permanently shrink under varying conditions of relative humidity.

The following examples which are intended to illustrate but not to unduly limit the invention and in which the parts and proportions are by weight, present different modes of applying the invention:

The table represents various coating compositions, involving the use of suitable organic solvents, which are utilized in carrying out the examples.

TABLE

Coating Solution Ingredients

[Per cent by weight]

| Formula No. | I | II | III | IV | V | VI | VII | VIII |
|---|---|---|---|---|---|---|---|---|
| Nitrocellulose (11.6% nitrogen) | 5.20 | 10.0 | | | | 1.0 | 6.75 | 4.89 |
| Ethyl Cellulose (45–48% ethoxy content) | | | 7.1 | | | | | |
| "Pliolite" resin [1] | | | | 10.08 | | | | |
| Chlorinated Rubber (65–68% chlorine) | | | | | 9.55 | | | |
| Paraffin Wax | 0.43 | 0.5 | 0.4 | 1.20 | 1.20 | | 0.48 | 0.03 |
| Damar Resin | | 1.4 | | | | | 1.64 | |
| "Beckacite" Resin (maleate modified ester gum) [2] | 3.50 | | | | | | | 1.17 |
| Treated or modified rosin [3] | | | | 2.5 | | 0.05 | | |
| Dibutyl Phthalate | 0.87 | 6.9 | | | | | 2.80 | 1.05 |
| Dicyclohexyl Phthalate | | | | | | | | 1.05 |
| Zinc stearate | | | | | | | 0.15 | |
| Urea Resin [4] | | | | | | 8.0 | | 2.95 |
| Paratoluene sulfonic acid | | | | | | 1.0 | | 0.56 |
| Polyisobutylene (approximate molecular weight—100,000) | | | | 0.72 | | | | |
| Chlorinated Paraffin (35–42% chlorine) | | | | | 4.20 | | | |
| Toluol | 24.3 | 24.0 | 74.0 | 88.00 | 85.00 | 16.5 | 28.53 | 35.3 |
| Ethyl Acetate | 55.8 | 46.2 | | | | 38.4 | 56.34 | 40.6 |
| Butyl Acetate | 1.8 | 9.6 | | | | | | |
| Ethyl Alcohol | 8.1 | 1.4 | 16.0 | | | 5.4 | 3.20 | |
| Isobutyl Alcohol | | | | | | 29.7 | | 12.4 |
| Acetone | | | | | | | 0.11 | |

[1] The resinous, thermoplastic rubber derivative made by condensing rubber in the presence of a tin catalyst as described in Thies and Clifford, "Journal of Indus. & Eng. Chem.," vol. 26, pp. 123–5 (1934) and in "Paper Trade Journal," p. 96, Feb. 23, 1939.
[2] Described in Lanning U. S. Patent No. 2,301,959.
[3] The modified rosin prepared as described in Morton U. S. Patent No. 2,017,866.
[4] Urea-formaldehyde-isobutanol resin made as described in Lanning U. S. Patent No. 2,301,959.

EXAMPLE I

Regenerated cellulose sheeting is coated with formula No. 1 from the table and the coating is dried by evaporation of the volatile solvents. The sheeting is then passed continuously through water at 65° C. at a speed which allows 60 seconds' immersion in the water. The film is passed through squeeze rolls to remove surface water after the treatment. The sheet, now containing 35% water, is dried on heated rolls at 80° C. The sheet is then allowed to shrink freely during the first stage of drying (down to 10% to 15% moisture) and then is dried under slight tension to a finished moisture of 6% to 7%. The treated sheet is smooth, flat and glossy. The permanent shrinkage is 80% less than the original value of the uncoated sheeting.

EXAMPLE II

Regenerated cellulose sheeting is coated with formula No. 2 from the table and the coating is dried as in Example I. The coated sheet is treated in 65° C. water for 16 seconds, whereby the moisture is increased to 20%, the surface water being removed, as by squeezing. The sheet is dried under slight tension in a tunnel at 50° to 60° C. to a final moisture content of 6.5%. The permanent shrinkage is reduced from 3.1% to 1.0%.

Similar results are obtained with films coated in a similar fashion with formulae Nos. 3, 4 and 5 from the table.

EXAMPLE III

Regenerated cellulose sheeting is coated with formula No. 6 from the table and the coating is dried as in Example I. The coated film is treated in water at 30° C. to increase the moisture to 35% and the surface water squeezed off. Moisture absorption is rapid and uniform even at this low temperature since the coating is permeable to water, though not swollen by the treatment. The dampened sheet is dried over heated rollers under slight tension. The resulting film is clear, smooth and has substantially no permanent shrinkage.

EXAMPLE IV

Regenerated cellulose sheeting is coated with formula No. 6 from the table and dried. The dry coated film is then topcoated with formula No. 7 from the table and the coating is dried. The coated sheet is immersed in 65° C. water for 15 seconds and the surface water removed. Moisture content is increased to approximately 20%. The sheet is dried under slight tension in a tunnel to 6.5% moisture, with the production of a film which is quite flat and substantially free from permanent shrinkage.

If very rapid moisture absorption is desired, this film may be treated in boiling water since the coating is not readily separated from the base sheet by the action of water, or the moisture may by introduced by subjecting the film to a treatment with wet steam.

EXAMPLE V

Regenerated cellulose sheeting is coated with formula No. 8 from the table and the coating is dried as in Example I. Sheets of the coated material are immersed in 65° C. water so as to contain 25% moisture, squeezed to remove surface water and subsequently dried at 100° C. as freely suspended sheets. These sheets are definitely flat and smooth in spite of the complete absence of any mechanical tension and the sheets are free from permanent shrinkage.

EXAMPLE VI

Regenerated cellulose sheeting is coated with formula No. 8 from the table and dried as in Example I. The sheeting is then treated with 65° C. water for 50 seconds and the surface water removed. The dampened sheet is dried on heated drier rolls under slight tension from an initial 35.5% moisture to 13.6% moisture and is then dried under normal drying tension to 5% moisture. The resulting film is clear, glossy, free from wrinkles and has no permanent shrinkage.

The shrunken sheet is laminated to paper and the cellulose-paper composite glued to the inside of chipboard drums approximately 12 inches in diameter. After a storage period of two months at alternating 80% relative humidity exposure and room exposure of lower humidity, the cellulose sheet remains firmly attached to the paper backing. Normal coated regenerated cellulose sheets similarly lined inside chipboard drums separate excessively from the paper backing and even without high humidity exposure, such sheets show excessive separation in two weeks and within a month are generally one third separated from the wall of the drum. This condition is unsatisfactory for commercial drum liners.

EXAMPLE VII

A transparent polyvinyl alcohol sheeting is coated with formula No. 6 from the table and the coating is dried as in Example I. The dried coating is then topcoated with formula No. 7 from the table and the coating is dried. The coated polyvinyl alcohol sheeting is passed through a tank of water at 65° C. After one minute, the excess water is removed from the surface and the film is dried on heated rolls under slight tension. The finished sheet is free from strains introduced in casting the polyvinyl alcohol sheet. The coating applied to this sheet has the further advantage of preserving the structure of the sheet since immersion in 65° water for one minute would dissolve or swell an uncoated sheet of polyvinyl alcohol so much that it could no longer be handled. Even exposure to high humidities or very rapid treatment in liquid water is commercially impossible for the highly water-sensitive uncoated polyvinyl alcohol sheeting. The coating also prevents tackiness of the film while it is damp. The coating on such highly water-sensitive sheets may be useful where the film is dampened for reasons other than removing permanent shrinkage strains, such as for dampening the sheet to increase flexibility or to produce an expanded sheet which may subsequently be shrunk over a bottle or bottle neck.

The regenerated cellulose sheeting used in the above examples contained 15% glycerin, based on the weight of the cellulose. However, the use of glycerin or of percentages of glycerin other than 15% is optional since even in the absence of glycerin, the practice of the invention effects the diminution or elimination of permanent shrinkage. However, glycerin or other suitable softener is used in regenerated cellulose film in order to impart proper flexibility.

The regenerated cellulose and polyvinyl alcohol sheeting utilized in the above examples has a thickness, prior to coating, of about 0.001 inch and the coating is applied uniformly to both sides of the film in such an amount that the dried coating increases the total thickness of the film about 10%. The regenerated cellulose sheeting utilized in the examples contains, prior to coating, about 7% moisture which is the moisture content representing the moisture equilibrium in air under standard conditions, namely at 75° F. and 35% relative humidity. The polyvinyl alcohol sheeting of Example VII contained 10% moisture, representing approximate moisture equilibrium under the same standard atmospheric conditions. However, the film, prior to coating, may contain from about 0.0% to about 10% moisture.

Most of the examples given above involve the use of a moistureproof coating, that is, a coating which will impart to the composite coated film a resistance to the passage of moisture at least ten times that of the uncoated film, when tested under the conditions set forth in Ubben U. S. Patent No. 2,147,180. Although the use of moistureproof coatings is preferred, the examples indicate that the invention can also be practiced by the use of water-insensitive coatings which are not moistureproof. When moistureproof coatings are used in the practice of the invention, the humidifying and drying treatments are carried out under conditions which will permit moisture to pass readily through the coating. Charch and Prindle U. S. Patent No. 1,737,187 described the passage through moistureproof coatings into a regenerated cellulose film base of a small amount of moisture, e. g. 6% to 7%, but in the practice of the present invention, moisture is readily absorbed through moistureproof coatings where the coated film is subjected to contact with liquid water at a temperature in the neighborhood of 60° and air, or with steam or high humidity air, e. g. 80% relative humidity or above, at a temperature of 80° C. or above. Generally speaking, the amount of moisture absorbed by the base film in the practice of this invention should be of the order of 20% to 40%, based on the weight of the water-sensitive film although this percentage can be higher.

During the water absorption step, it is preferred that the tension on the film be less than that which will substantially stretch or elongate the film since this precaution will facilitate the removal of permanent shrinkage during the drying operation due to freedom of the film from such added strain as would be induced by stretching during wetting.

The conditions present during water absorption into the base sheet will vary according to the nature of the coating composition; i. e., in some cases a longer exposure to water or moisture at a lower temperature will be preferred, whereas in other cases a shorter exposure at higher temperatures will produce more satisfactory results. For example, where formula No. 2 of the table is used, the coated film may be subjected to water at 65° for as long as four or five minutes, but should not be subjected to water at 95° to 100° C. for more than one minute since, in the latter case, the coating tends to be readily separated from the base sheet at the higher temperature.

After the film during treatment has reached the proper moisture content, it is dried down to that moisture content which is conventional for regenerated cellulose films now on the market, i. e. to a moisture content of the order of 6% to 8%, or even as high as 10% in order that the film may have a moisture content in approximate equilibrium with average atmospheric conditions.

As is indicated in the examples, the drying is carried out under low tension in order not to introduce any strains into the coated structure. It is, of course, preferred that some tension be applied to the film during drying in order to insure that the final film is flat and free from wrinkles. The tension used should be high enough to prevent the formation of wrinkles, but not so high as to prevent that degree of freedom of shrinkage which will eliminate a substantial amount of permanent shrinkage. The preferred tension is in the neighborhood of 0.05 pound per lineal inch across the width of the film, for film 0.001 inch in thickness, but tensions as high as 0.5 pound and as low as 0.02 pound may be used with good results. The magnitude of tension indicated in this paragraph and equivalent tensions for other thicknesses of film are embraced within the terms "slight tension" and "low tension," as used throughout the specification.

Alles and Edwards U. S. Patent No. 2,115,132 may be referred to for a general understanding of the value of low tension during drying and this patent also describes a general method for measuring tension. It is to be understood however that the film may be dried without the use of extraneous tension if it is maintained in a flat, unwrinkled condition during drying. It is also to be understood, as indicated in Example VI, that a substantial removal of permanent shrinkage is accomplished if low tension is used during the removal of the first portion of the absorbed moisture, even though the removal of a portion of the water is thereafter carried out under normal tension, i. e. a tension of 1.0 or more pounds per lineal inch.

Although the invention has particular value in the treatment of regenerated cellulose film, other non-fibrous, water-sensitive films may likewise be treated to advantage in accordance with the principles of the invention. Examples of such other films are those produced from polyvinyl alcohol, and from cellulose ethers and cellulose esters having a low degree, i. e. ¼ mol to ¾ mol substitution per mol of cellulose, of substitution of alkyl or acyl radicals in the cellulose molecule, e. g. lowly etherified methyl cellulose, ethyl cellulose and cellulose glycollic acid and lowly esterified cellulose acetate, cellulose butyrate and cellulose aceto-butyrate. Such materials as may be advantageously treated in accordance with this invention are included in the term "water-sensitive material" and the term "water-sensitive" is intended to embrace those materials which will readily absorb water as is evidenced by their absorption of 50% moisture, based on the weight of the hygroscopic material when immersed in the form of a film of 0.001 inch thickness in liquid water at 65° C. for a period of five minutes.

Table I above gives examples of different types of suitable water-insensitive film-forming agents, e. g. nitrocellulose, highly ethylated ethyl cellulose, rubber hydrochloride, chlorinated rubber, etc. However, any water-insensitive film-forming material may be used as the coating and by the term "water-insensitive" is meant a film-forming material which, in the form of a film of 0.001 inch thickness, will absorb not in excess of 10% moisture, when immersed in liquid water at a temperature of 65° C. for a period of five minutes. The most suitable way to apply the coating is from a solution of the film-forming agent in an organic solvent.

The greatest advantages of the invention are obtained in the treatment of thin films of the order of 0.001 inch, suitable for use as wrapping tissue. However, the invention contemplates the treatment of films of much greater, and of somewhat less thickness, e. g. thicknesses of 0.005 to 0.0005 inch. The invention is also applicable to the treatment of articles composed of water-sensitive compounds in forms other than films where permanent shrinkage occurs under ordinary conditions of use.

While the invention in its preferred form results in a coated film, it will be understood that the coating may be removed after a film of low permanent shrinkage is produced in any suitable manner. For example, the coated film may be run through a tower containing solvent vapor which softens the coating or releases the anchorage of it to the base film. The coating may then be stripped away and the uncoated film wound up.

The advantages which arise from the practice of this invention are interesting and valuable. It is now possible to produce commercially, for example, a regenerated cellulose film practically free from internal strains and having a very low permanent shrinkage. The availability of this film opens up fields of exploitation hitherto closed to such types of film. Mention might be made of the lamination of such transparent films to maps and other structures and the use of such new materials for the lining of cardboard containers. Whereas the regenerated cellulose film now on the market has been known to shrink quite badly with loss of moisture content, there is now available a film which, like so many other materials with which it might be used, is comparatively stable in its dimensions with loss of moisture content. It is equally important to observe that this type of film is made available by a process which involves the use of no new chemicals or equipment and which is but a minor deviation from existing commercial procedures.

Since the invention is capable of considerable variation from the conditions set forth above, any variation which conforms to the principles of the invention is intended to be included within the scope of the claims.

I claim:

1. The process which comprises applying to a substantially dry, non-fibrous, water-sensitive film a coating comprising a water-insensitive film-forming agent, subjecting said composite article to the action of water until a substantial amount of water is absorbed, then removing absorbed water while maintaining the article under little or no tension and free from wrinkles.

2. The process which comprises applying to a substantially dry, non-fibrous, water-sensitive, thin film a coating comprising a water-insensitive film-forming agent, subjecting said composite article to the action of water until a substantial amount of water is absorbed, then removing absorbed water while maintaining the article under little or no tension and free from wrinkles.

3. The process which comprises applying to a substantially dry, water-sensitive, thin regenerated cellulose film a coating comprising a water-insensitive film-forming agent, subjecting said composite article to the action of water until a substantial amount of water is absorbed, then removing absorbed water while maintaining the article under little or no tension and free from wrinkles.

4. The process which comprises applying to a substantially dry, water-sensitive, thin regenerated cellulose film a moistureproofing coating comprising a water-insensitive film-forming agent, subjecting said composite article to the action of water until a substantial amount of water is absorbed, then removing absorbed water while maintaining the article under little or no tension and free from wrinkles.

DONALD ELLSWORTH DREW.

REFERENCES CITED

The following references are of record in the file of this patent:

UNITED STATES PATENTS

| Number | Name | Date |
|---|---|---|
| 2,063,888 | Bracewell | Dec. 15, 1936 |
| 2,159,151 | Hershberger | May 23, 1939 |
| 2,252,091 | Muller | Aug. 12, 1941 |
| 2,058,703 | Malivert | Oct. 27, 1936 |